United States Patent
Lai et al.

(10) Patent No.: US 9,958,593 B2
(45) Date of Patent: May 1, 2018

(54) BACKLIGHT MODULE AND DISPLAY DEVICE INCLUDING THE SAME

(71) Applicants: RADIANT OPTO-ELECTRONICS (SUZHOU) CO. LTD., Wujiang, Jiangsu (CN); RADIANT OPTO-ELECTRONICS CORPORATION, Kaohsiung (TW)

(72) Inventors: Chun-Hau Lai, Kaohsiung (TW); Wei-Hsuan Chen, Kaohsiung (TW)

(73) Assignees: RADIANT OPTO-ELECTRONICS (SUZHOU) CO. LTD., Wujiang (CN); RADIANT OPTO-ELECTRONICS CORPORATION, Kaohsiung (TW)

(*) Notice: Subject to any disclaimer, the term of this patent is extended or adjusted under 35 U.S.C. 154(b) by 0 days. days.

(21) Appl. No.: 15/291,136

(22) Filed: Oct. 12, 2016

(65) Prior Publication Data

US 2017/0031083 A1 Feb. 2, 2017

Related U.S. Application Data

(63) Continuation of application No. PCT/CN2015/099785, filed on Dec. 30, 2015.

(30) Foreign Application Priority Data

Jun. 9, 2015 (CN) .......................... 2015 1 0313507

(51) Int. Cl.
*G02F 1/136* (2006.01)
*F21V 8/00* (2006.01)
*G02F 1/1335* (2006.01)

(52) U.S. Cl.
CPC .......... *G02B 6/0036* (2013.01); *G02B 6/005* (2013.01); *G02B 6/0053* (2013.01);
(Continued)

(58) Field of Classification Search
CPC ................. G02F 1/133603; G02F 200/133614
See application file for complete search history.

(56) References Cited

U.S. PATENT DOCUMENTS

2006/0056166 A1  3/2006  Yeo et al.
2013/0094242 A1* 4/2013  Yang .................... G02F 1/1336
                                                    362/602
(Continued)

FOREIGN PATENT DOCUMENTS

CN  101737725 A  6/2010
CN  103228983 A  7/2013
(Continued)

OTHER PUBLICATIONS

PCT/CN2015/099785 International Search Report dated Mar. 24, 2016 (4 pages).
(Continued)

*Primary Examiner* — Phu Vu
(74) *Attorney, Agent, or Firm* — Perkins Coie LLP

(57) ABSTRACT

A backlight module includes a light source, a light guide plate, and a quantum dot enhancement film. The light guide plate has a light-incident side that faces toward the light source, a surrounding side that is connected to the light-incident side to constitute an outer periphery of the light guide plate, and a microstructure unit that is disposed adjacent to the surrounding side of the light guide plate. The quantum dot enhancement film is stacked on the light guide plate.

26 Claims, 10 Drawing Sheets

(52) U.S. Cl.
CPC .. *G02F 1/133603* (2013.01); *G02F 1/133615* (2013.01); *G02B 6/0031* (2013.01); *G02B 6/0038* (2013.01); *G02B 6/0061* (2013.01); *G02F 2001/133614* (2013.01)

(56) References Cited

U.S. PATENT DOCUMENTS

| | | | | |
|---|---|---|---|---|
| 2015/0070934 | A1* | 3/2015 | Chou | G02B 6/0051 362/613 |
| 2016/0097889 | A1* | 4/2016 | Kim | G02B 6/005 362/607 |

FOREIGN PATENT DOCUMENTS

| | | |
|---|---|---|
| CN | 103698937 A | 4/2014 |
| CN | 103742833 A | 4/2014 |
| CN | 203615170 U | 5/2014 |
| CN | 104061496 A | 9/2014 |
| CN | 104090424 A | 10/2014 |
| CN | 204807876 U | 11/2015 |
| TW | 201510619 A | 3/2015 |
| TW | 200643548 A | 12/2016 |
| WO | 2015037968 A1 | 3/2015 |

OTHER PUBLICATIONS

TW104120584 Search Report from the Taiwan Intellectual Property Office dated May 13, 2016 (2 pages).

\* cited by examiner

BACKLIGHT MODULE AND DISPLAY DEVICE INCLUDING THE SAME

CROSS-REFERENCE TO RELATED APPLICATION

This application is a bypass continuation of International Application No. PCT/CN2015/099785 filed on Dec. 30, 2015, which claims priority from Chinese Patent Application Serial No. 201510313507.7, filed on Jun. 9, 2015, the entire content of each of which is incorporated herein by reference.

FIELD

Embodiments of the present disclosure generally relate to a backlight module and a display device including the same, more particularly to a backlight module having a quantum dot enhancement film and a display device including the same.

BACKGROUND

A quantum dot enhancement film (QDEF) is an optical element currently used in backlight modules to enhance color display. Generally, a conventional quantum dot enhancement film may include two types of quantum dots dispersed in a thin film. When a light source irradiates light of a certain wavelength range, e.g., blue light, on the conventional quantum dot enhancement film, the two types of quantum dots may correspondingly emit red light and green light upon receiving the blue light, resulting in white light emission due to mixing of the same. An output ratio of the produced red and green lights to the incident blue light may be altered so that color adjustment of the mixed white light into a relatively natural light color is possible. By doing so, the color display on a display device utilizing the conventional quantum dot enhancement film can be relatively accurate.

Referring to FIGS. 1 and 2, a conventional display device includes a backlight module 1, a plurality of optical films 17 and a liquid crystal display panel (not shown). The backlight module 1 comprises a back plate 11, a side frame member 12 that is connected to the back plate 11 and that cooperates with the back plate 11 to define a receiving space 10, a light guide plate 13 that is disposed in the receiving space 10, a quantum dot enhancement film 14 that is disposed on a bottom surface of the light guide plate 13 and that is located in the receiving space 10, a light source (not shown) that is disposed in the receiving space 10 and adjacent to the light guide plate 13, and a reflector 15 that is disposed to surround the light guide plate 13. The optical films 17 are stacked on the light guide plate 13 opposite to the quantum dot enhancement film 14, and the liquid crystal display panel is provided thereupon. The light emitted from the light source of the backlight module 1 may be transmitted into and propagate within the light guide plate 13, where the optical films 17 can promote light reflection at a top surface of the light guide plate 13. Consequently, the total amount of light incident into the quantum dot enhancement film 14, as illustrated in FIG. 2, may be increased, generating a compensation light therefrom (such as red and green lights for the incident blue light). However, lateral portions of the quantum dot enhancement film 14 may have an insufficient amount of light incident from the light guide plate 13. Due to the lack of compensation light, the color of light emitted from lateral portions of the conventional display device may differ from that of the light emitted from central portions, resulting in an undesirable, so-called "blue edge" phenomenon to occur on the conventional display device.

SUMMARY

Certain embodiments of the present disclosure provide a backlight module which may include a casing unit, a light source, a light guide plate, and a quantum dot enhancement film. The casing unit defines a receiving space. The light source is disposed in the receiving space. The light guide plate is disposed in the receiving space and has a light-incident side that faces toward the light source, a surrounding side that is connected to the light-incident side to constitute an outer periphery of the light guide plate, and a microstructure unit that is disposed adjacent to the surrounding side of the light guide plate. The quantum dot enhancement film is disposed in the receiving space and is stacked on the light guide plate.

BRIEF DESCRIPTION OF THE DRAWINGS

Other features and advantages of the disclosure will become apparent in the following detailed description of the exemplary embodiments with reference to the accompanying drawings, of which.

DETAILED DESCRIPTION

Figure 1:
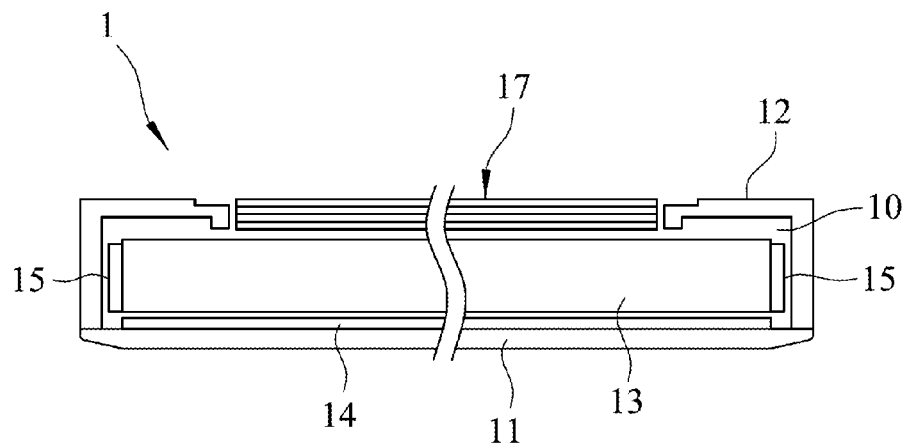
FIG. 1 is a schematic view illustrating a conventional display device.
Figure 2:
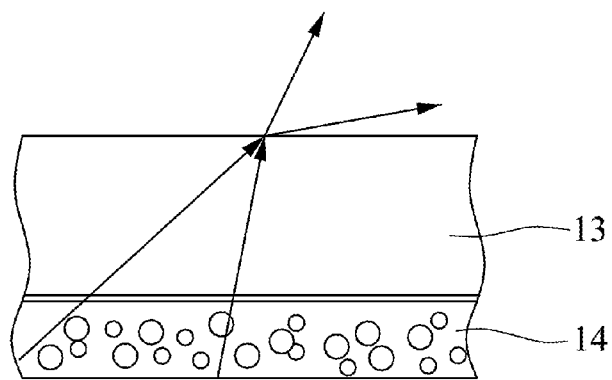
FIG. 2 is a fragmentary schematic view of the conventional display device.

It may be noted that like elements are denoted by the same reference numerals throughout the disclosure.

Figure 3:
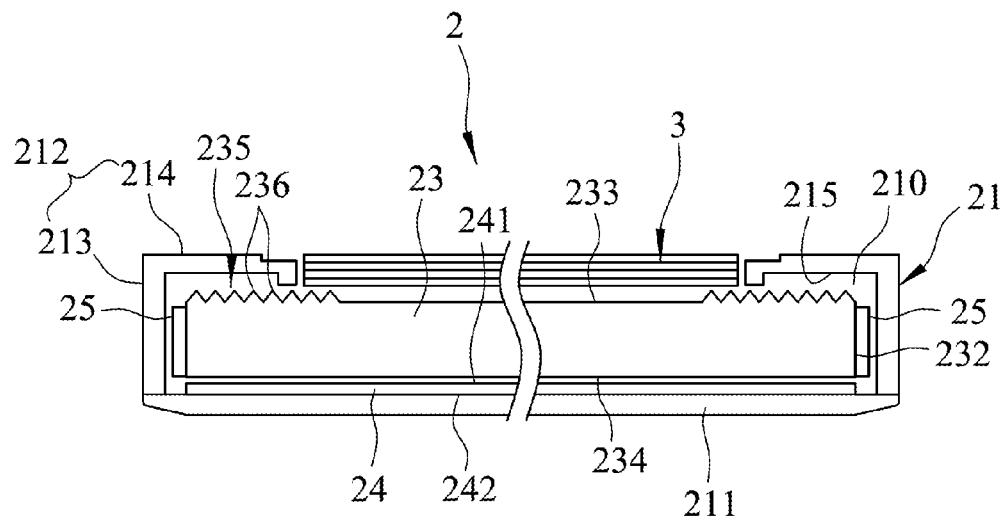
FIG. 3 is a schematic view illustrating one embodiment of a display device according to the present disclosure.
Figure 4:
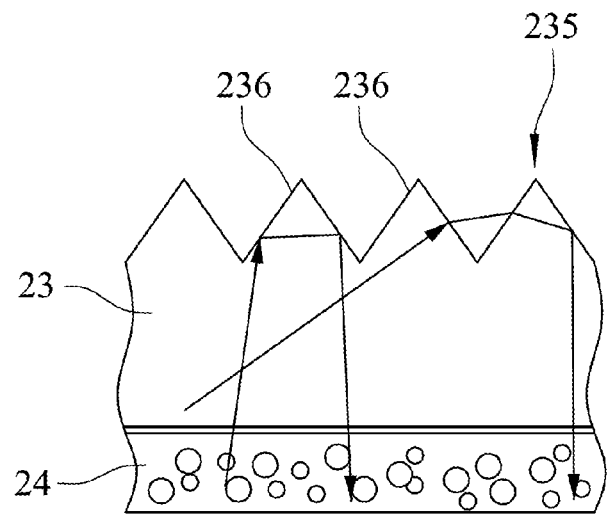
FIG. 4 is a fragmentary schematic view of one embodiment of a light guide plate that may be embodied in FIG. 3.
Figure 6:
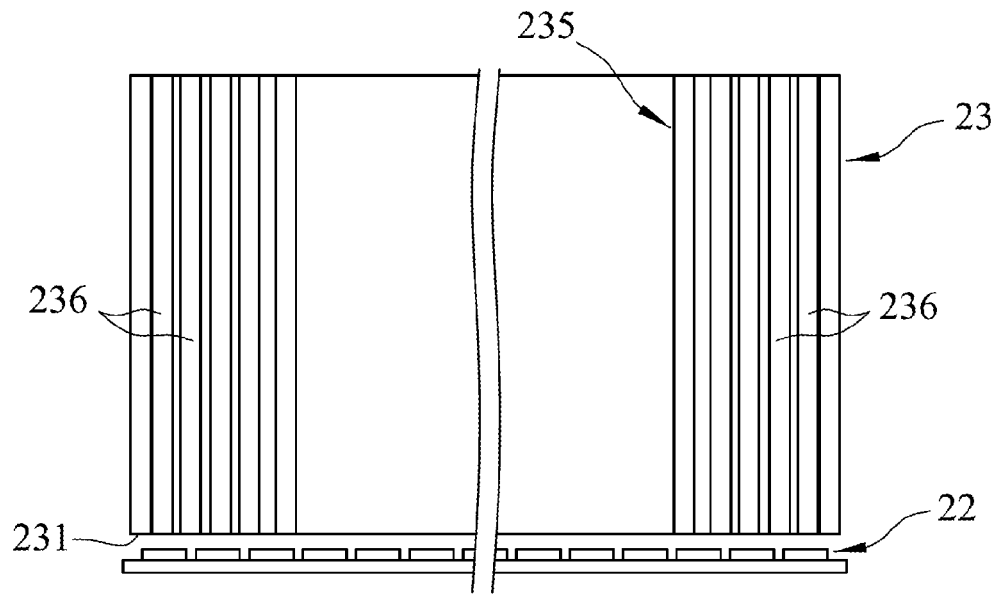
FIG. 6 is a schematic top view illustrating another embodiment of the light guide plate that may be embodied in FIG. 3.

Referring to FIGS. 3, 4 and 6, a first exemplary embodiment of a backlight module 2 according to the present disclosure is shown to include a casing unit 21 defining a receiving space 210, a light source 22 disposed in the receiving space 210, a light guide plate 23 disposed in the receiving space 210, a quantum dot enhancement film 24 stacked on the light guide plate 23 and disposed in the receiving space 210, and a reflector 25 disposed in the receiving space 210 to surround the light guide plate 23 for reflecting back the light incident from the light guide plate 23.

As shown in FIG. 3, the casing unit 21 of this embodiment includes a back plate 211, and a side frame 212 cooperating with the back plate 211 to define the receiving space 210. The side frame 212 has an extending portion 213 that is connected to and extends from an outer periphery of the back plate 211, and a projecting portion 214 that is connected to a distal end of the extending portion 213 distal from the back plate 211, that projects inwardly from the distal end of the extending portion 213 to the receiving space 210 and that has an inner reflective surface 215 facing toward the quantum dot enhancement film 24. In this embodiment, at least the projecting portion 214 of the side frame 212 is made of a light reflective material for reflecting light incident from the light guide plate 23.

Figure 5:
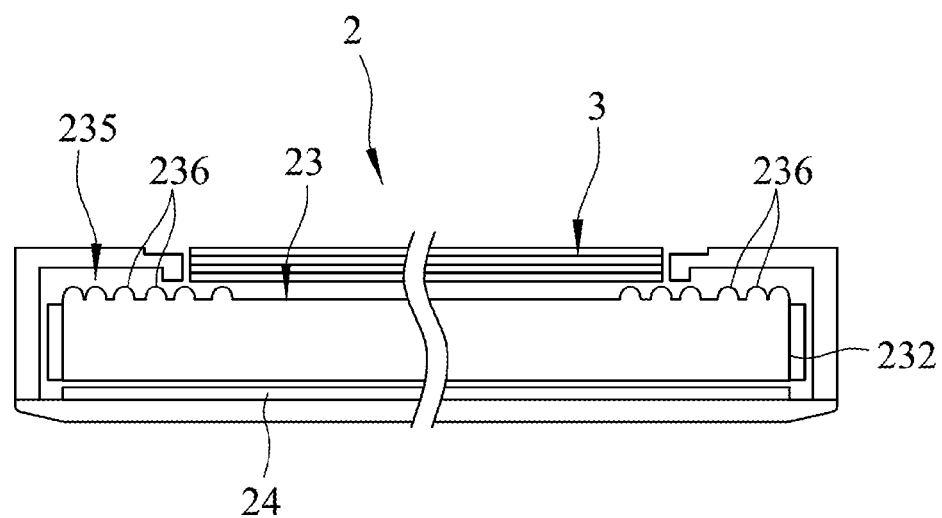
FIG. 5 is a schematic view illustrating another embodiment of the display device.
Figure 7:
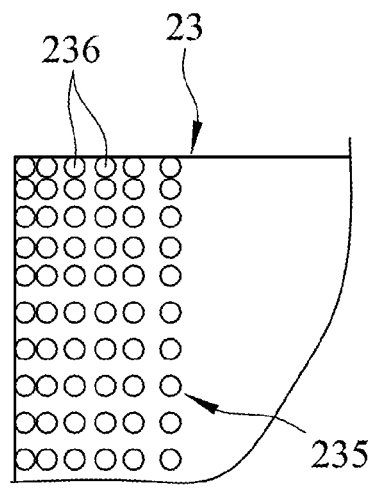
FIG. 7 is a schematic top view illustrating yet another embodiment of the light guide plate that may be embodied in FIG. 3.

In this embodiment, the light guide plate 23 has a light-incident side 231 that faces toward the light source 22 (see FIG. 6), a surrounding side 232 that is connected to the light-incident side 231 to constitute an outer periphery of the light-guide plate 23, a first microstructure unit 235 that is disposed adjacent to the surrounding side 232, and opposite top and bottom surfaces 233, 234. To be specific, the light guide plate 23 has a central portion, and a lateral portion surrounding the central portion, and having the light-incident side 231 and the surrounding side 232, where the first microstructure unit 235 is formed only on the lateral portion of the light guide plate 23 and defines a microstructure-free region surrounded by the first microstructure unit 235. In this embodiment, the first microstructure unit 235 may have a matte surface and include a plurality of first microstructures 236 which may be configured in various shapes, such as protrusions or indentations. For instance, the first microstructures 244 may be configured as elongated ridges defining elongated trenches or stripes therebetween (see FIG. 6), or as semi-spherical indentations or dots as illustrated in FIG. 7. As shown in FIGS. 3 and 4, the first microstructures 236 of this embodiment may have a V-shaped cross section but are not limited thereto according to the present disclosure. For example, the first microstructures 236 may have an arc-shaped cross section (also known as R-cut) as illustrated in FIG. 5.

Figure 8:
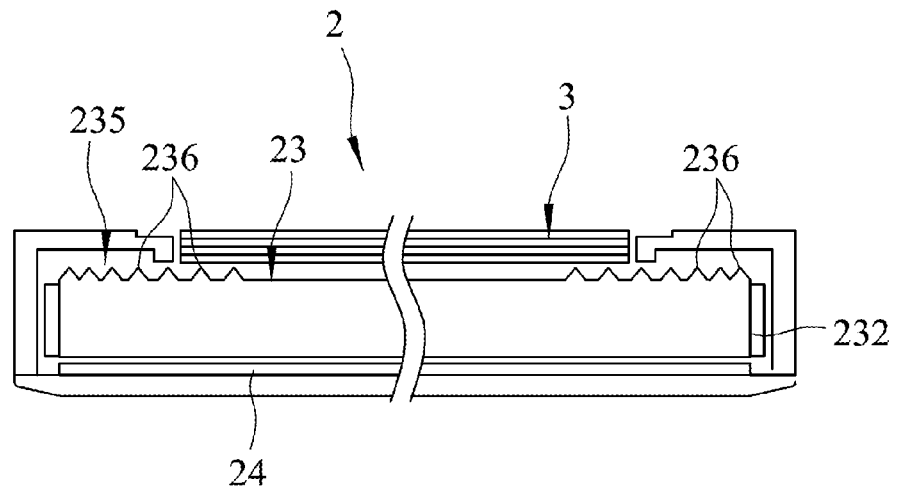
FIG. 8 is a schematic view illustrating yet another embodiment of the display device.
Figure 9:
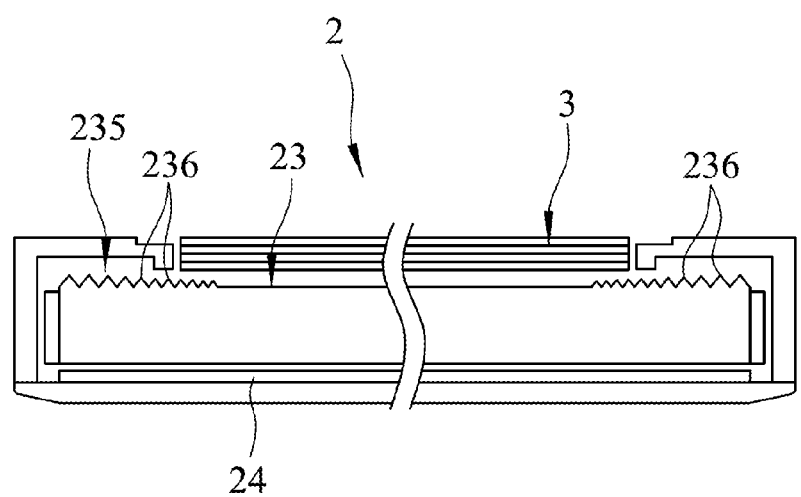
FIG. 9 is a schematic view illustrating yet another embodiment of the display device.
Figure 10:
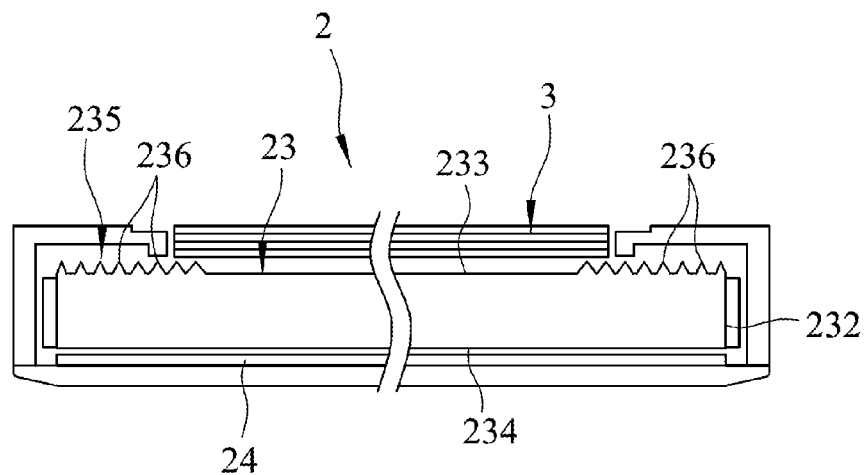
FIG. 10 is a schematic view illustrating yet another embodiment of the display device.

In certain embodiments, the first microstructures 236 may be configured as protrusions or indentations having various heights or depths, i.e., the first microstructure unit 235 may be formed by roughening. As shown in FIG. 3, in this embodiment, a surface density of the first microstructures 236 may be uniform, and the depths, heights and height-over-width ratios of the first microstructures 236 may be identical. In certain embodiments, the surface density of the first microstructures 236 may be negatively correlated with the distance to the surrounding side 232 of the light guide plate 23, as illustrated in FIG. 8. In certain embodiments, the first microstructures 236 may include a plurality of protrusions having heights that decrease as the distance to the surrounding side 232 of the light guide plate 23 increases, as illustrated in FIG. 9. In certain embodiments, the first microstructures 236 may include a plurality of indentations having depths that decrease as the distance to the surrounding side 232 of the light guide plate 23 increases. In certain embodiments, the first microstructures 236 may include a plurality of protrusions having height-over-width ratios that decrease as the distance to the surrounding side 232 of the light guide plate 23 increases, as illustrated in FIG. 10.

In this embodiment, the quantum dot enhancement film 24 has a light incident surface 241 that is disposed to face the bottom surface 234 of the light guide plate 23, and an optical surface 242 that is opposite to the light incident surface 241.

When the light incident from the light source 22 enters the light guide plate 23, there is a higher chance for the same to be reflected back by the first microstructure unit 236 formed on the top surface 233 of the light guide plate 23 and enter the quantum dot enhancement film 24 multiple times. Accordingly, quantum dots in the quantum dot enhancement film 24 which correspond in position to the surrounding side 232 of the light guide plate 23 may have a higher chance of being excited by the incident light due to the increased number of times that the incident light passes through the quantum dot enhancement film 24. As such, sufficient compensation light can be produced by the quantum dots located adjacent to the surrounding side 232 of the light guide plate 23, and thus the blue edge phenomenon can be prevented.

Figure 11:
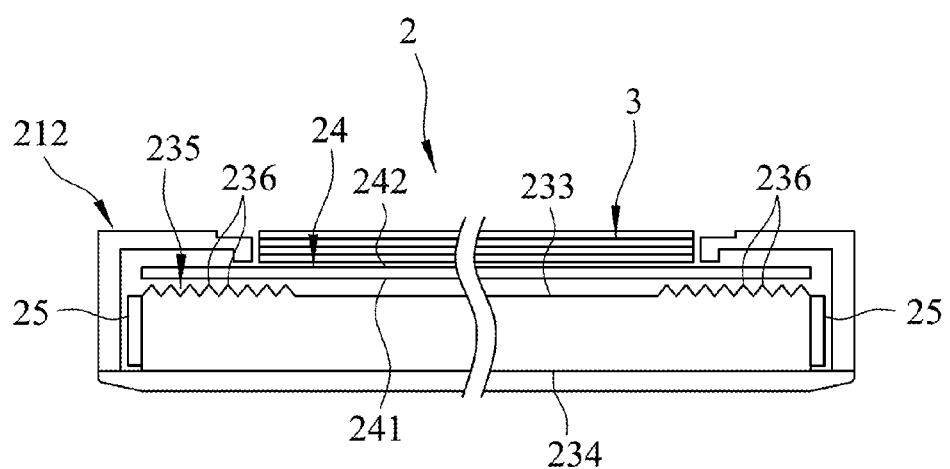
FIG. 11 is a schematic view illustrating yet another embodiment of the display device.

Referring to FIG. 11, a second exemplary embodiment of the backlight module 2 according to the present disclosure is shown to be similar to that of the first exemplary embodiment, with the difference residing in that the quantum dot enhancement film 24 is disposed on the top surface 233 of the light guide plate 23, and the light incident surface 241 of the quantum dot enhancement film 24 faces toward the top surface 233 of the light guide plate 23. The backlight module 2 of the second exemplary embodiment has advantages similar to those of the first exemplary embodiment.

Figure 12:
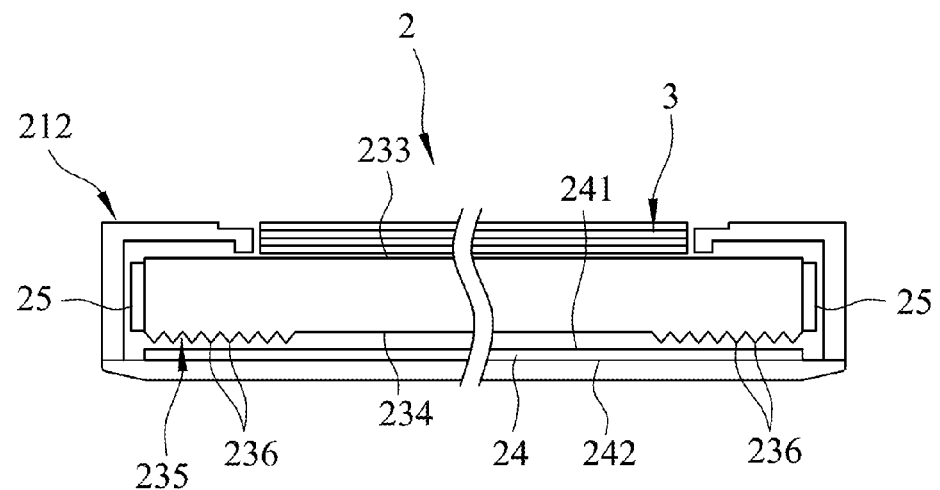
FIG. 12 is a schematic view illustrating yet another embodiment of the display device.

Referring to FIG. 12, a third exemplary embodiment of the backlight module 2 according to the present disclosure is shown to be similar to that of the first exemplary embodiment, with the only difference residing in that the first microstructures 236 of the first microstructure unit 235 are formed on the bottom surface 234 of the light guide plate 23 and face toward the light incident surface 241 of the quantum dot enhancement film 24. The backlight module 2 of the third exemplary embodiment has advantages similar to those of the first exemplary embodiment.

Figure 13:
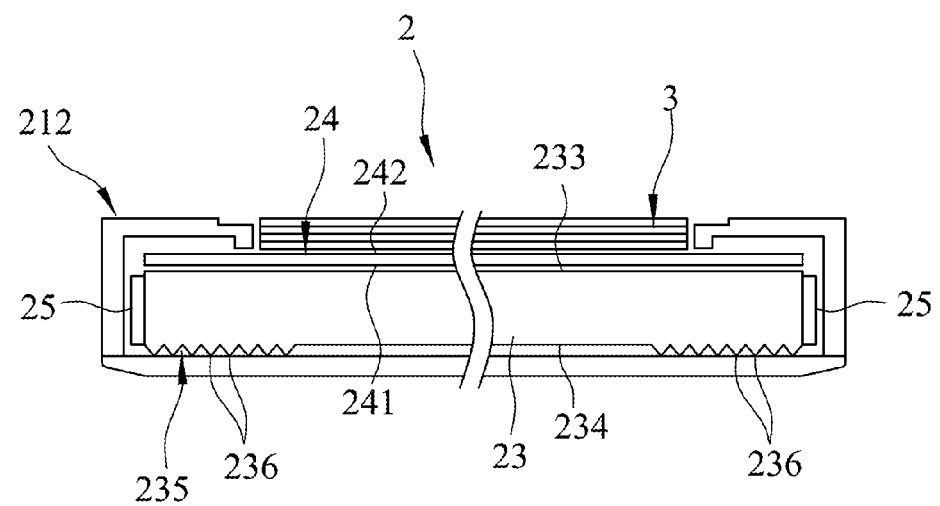
FIG. 13 is a schematic view illustrating yet another embodiment of the display device.

Referring to FIG. 13, a fourth exemplary embodiment of the backlight module 2 according to the present disclosure is shown to be similar to that of the third exemplary embodiment, with the difference residing in that the quantum dot enhancement film 24 is disposed on the top surface 233 of the light guide plate, and the light incident surface 241 of the quantum dot enhancement film 24 faces the top surface 233 of the light guide plate 23. The backlight module 2 of the fourth exemplary embodiment has advantages similar to those of the third exemplary embodiment.

Figure 14:
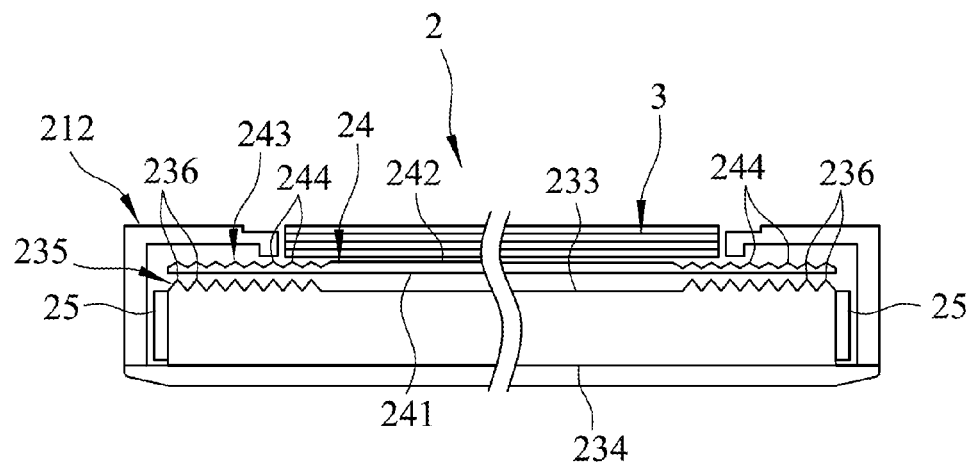
FIG. 14 is a schematic view illustrating yet another embodiment of the display device.

Referring to FIG. 14, a fifth exemplary embodiment of the backlight module 2 according to the present disclosure is shown to be similar to that of the second exemplary embodiment. The differences between the second and fifth exemplary embodiments are as follows. The quantum dot enhancement film 24 of the fifth exemplary embodiment has a second microstructure unit 243 that is located on the optical surface 242 and that is disposed adjacent to the surrounding side 232 of the light guide plate 23 and corresponding in position to the first microstructure unit 235. The second microstructure unit 243 may include a plurality of second microstructures 244 having structural configurations which are similar to those of the first microstructures 236.

The backlight module 2 of the fifth exemplary embodiment has advantages similar to those of the second exemplary embodiment.

Figure 15:
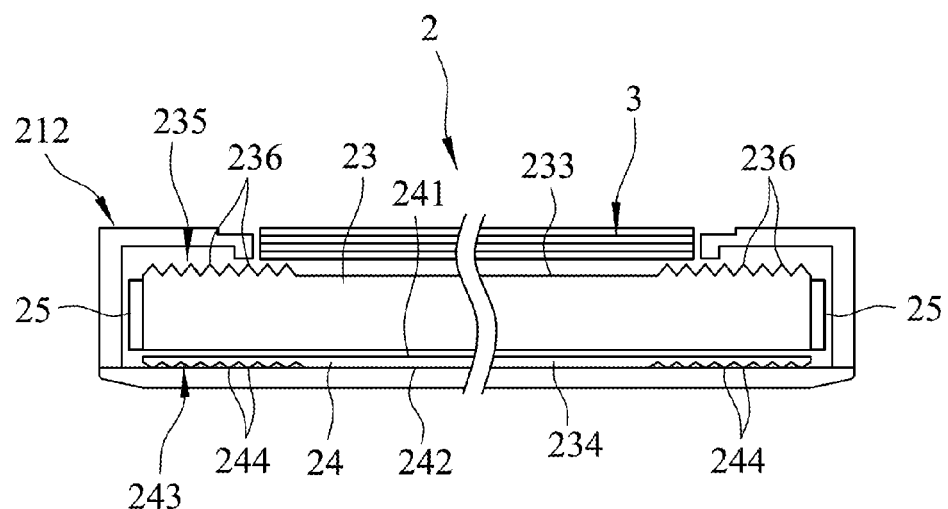
FIG. 15 is a schematic view illustrating yet another embodiment of the display device.
Figure 16:
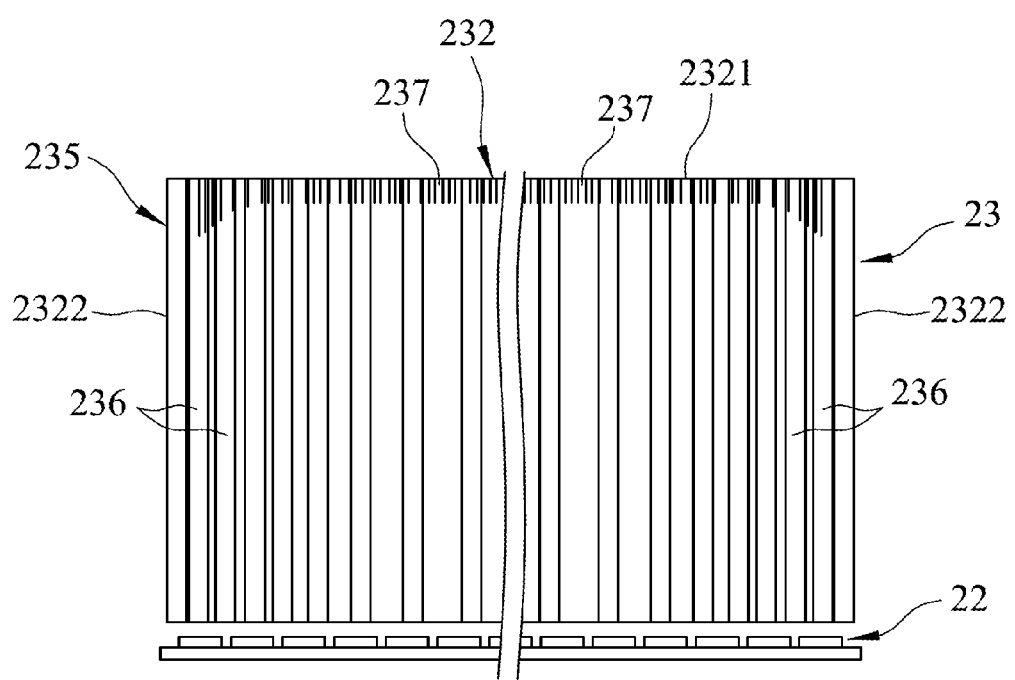
FIG. 16 is a schematic top view illustrating another embodiment of the light guide plate.

Referring to FIG. 15, a sixth exemplary embodiment of the backlight module 2 according to the present disclosure is shown to be similar to that of the second exemplary embodiment. The differences between the second and sixth exemplary embodiments are as follows. The surrounding side 232 of the light guide plate 23 has a central segment 2321 that is opposite to the light-incident side 231, and a pair of lateral segments 2322 interconnecting the central segment 2321 and the light-incident side 231. The first microstructure unit 236 of the sixth exemplary embodiment may further include a plurality of third microstructures 237 disposed adjacent to the central segment 2321. As shown in FIG. 16, the third microstructures 237 include a plurality of grooves each extending along an axis normal to the light-incident side 231 from the central segment 2321 of the surrounding side 232 toward the light-incident side 231. The grooves of the third microstructures 237 have lengths that decrease as the distance to a nearest one of the lateral segments 2322 of the surrounding side 232 increases. In this way, brightness of the backlight module 2 around the edges and the corners away from the light source 22 can be effectively enhanced, so as to prevent formation of dark bands thereat.

As illustrated in FIG. 3, one embodiment of a display device according to the present disclosure may comprise the backlight module 2, a plurality of optical films 3 stacked on the light guide plate 23, and a liquid crystal panel stacked on the optical films 3 (not shown in the figures). In certain embodiments, the optical films 3 may be stacked on the light guide plate 23 opposite to the quantum dot enhancement film 24. The liquid crystal panel may be stacked on the optical films 3 opposite to the light guide plate 23. It should be noted that the backlight module 2 may be configured as described in other embodiments according to the present disclosure.

Figure 17:
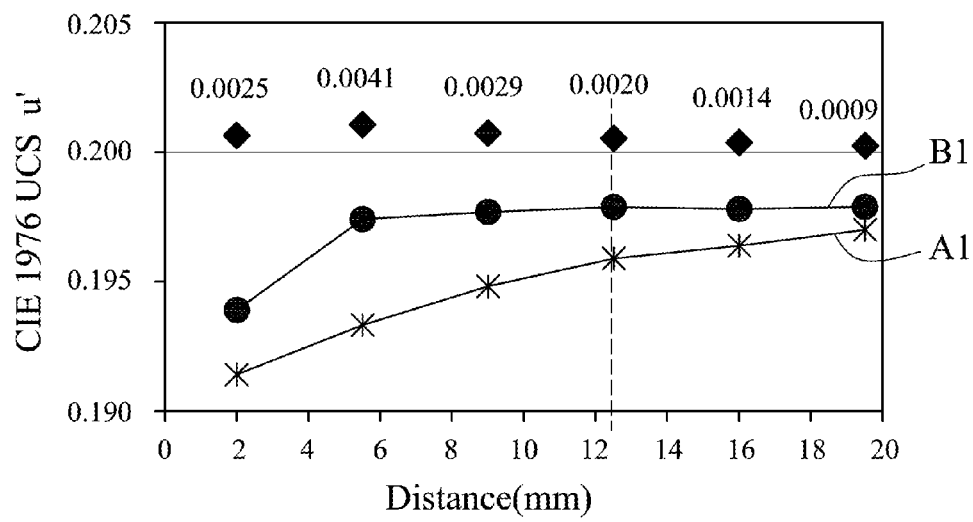
FIGS. 17 and 18 are graphs respectively illustrating chromaticity parameters of the conventional display device as shown in FIG. 1 and the display device as shown in FIG. 3, with respect to the distance to a lateral side of each display device.
Figure 18:
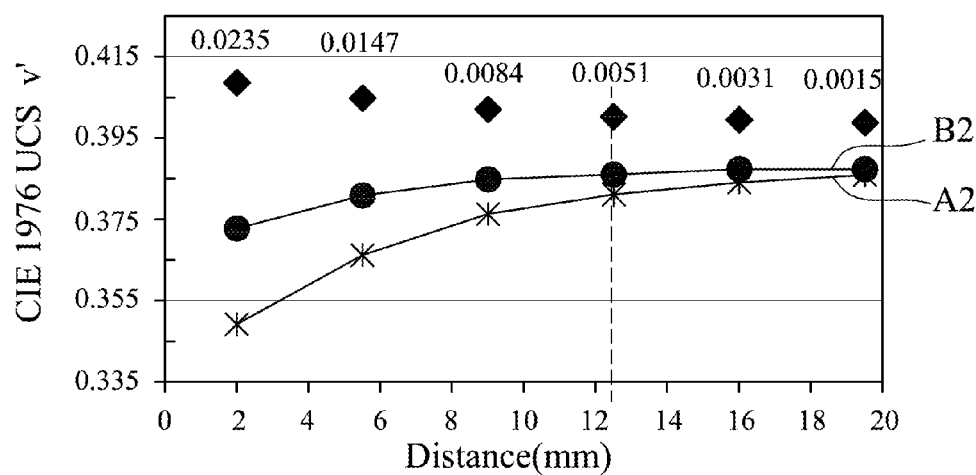

The display chromaticity of the conventional display device as illustrated in FIG. 1 and the display device as illustrated in FIG. 3 were examined. FIGS. 17 and 18 respectively illustrate the chromaticity parameters u' and v' in CIE 1976 UCS with respect to the distance from a lateral side of each display device (corresponding in position to one of the lateral segments 2322 of the surrounding side 232 of the light guide plate 23), where a vertical dash line depicted in each of FIGS. 17 and 18 represents a boundary of an extended region of the light guide plate 23 on which the first microstructure unit 236 is disposed. The data obtained from the conventional display device are plotted as Lines A1 (in FIG. 17) and A2 (in FIG. 18), the data obtained from the display device of the present disclosure as illustrated in FIG. 3 are plotted as Lines B1 (in FIG. 17) and B2 (in FIG. 18), and the differences between the data from the conventional display device and the display device of the present disclosure are represented by diamond points in both figures. The plotted Lines A1 and A2 clearly and respectively illustrate that the chromaticity parameters u' and v' start to drop from a relatively long distance to the lateral side (~12 mm), which means the blue edge phenomenon is significant in the conventional display device. In comparison, the plotted Lines B1 and B2 respectively illustrate that the parameters u' and v' do not start to drop until at a relatively close distance to the lateral side of the display device (4~6 mm), which means the blue edge phenomenon is effectively reduced in the display device of the present disclosure.

To sum up, by virtue of forming the first microstructure unit 236 on the light guide plate 23 and adjacent to the surrounding side 232 of the light guide plate 23, the light emitted from the light source 22 or reflected by the reflector 25 can pass through the quantum dot enhancement film 24 multiple times, so that the quantum dots in the quantum dot enhancement film 24 located adjacent to the surrounding side 232 of the light guide plate 23 may have a higher chance of being excited by the incident light due to the increased number of times that the incident light passes through the quantum dot enhancement film 24. As such, sufficient compensation light can be produced by the quantum dots around the surrounding side 232 of the light guide plate 23, and the aforementioned drawbacks of the prior art can be prevented.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A backlight module, comprising:
   a light source;
   a light guide plate having a light-incident side that faces toward said light source, a surrounding side that is connected to said light-incident side to constitute an outer periphery of said light guide plate, and a first microstructure unit that is disposed adjacent to said surrounding side of said light guide plate; and
   a quantum dot enhancement film stacked on said light guide plate;
   wherein said first microstructure unit includes a plurality of first microstructures, and said first microstructures include a plurality of protrusions having height-over-width ratios that decrease as a distance to said surrounding side of said light guide plate increases.

2. The backlight module according to claim 1, wherein said first microstructure unit is arranged along a direction from said surrounding side toward a center of said light guide plate, so as to define a microstructure-free region surrounded by said first microstructure unit.

3. The backlight module according to claim 1, wherein said light guide plate includes a central portion and a lateral portion that surrounds said central portion, and that has said light-incident side and said surrounding side, said first microstructure unit being formed only on said lateral portion without being formed on said central portion.

4. The backlight module according to claim 1, wherein said light guide plate further has opposite top and bottom surfaces, one of said top and bottom surfaces faces toward said quantum dot enhancement film, and said first microstructure unit is located on one of said top or bottom surfaces.

5. The backlight module according to claim 1, wherein said quantum dot enhancement film has
   a light incident surface facing toward said light guide plate,
   an optical surface that is opposite to said light incident surface, and
   a second microstructure unit that is located on said optical surface, that is disposed corresponding in position to said first microstructure unit and that includes a plurality of second microstructures.

6. The backlight module according to claim 1, wherein:
   said surrounding side of said light guide plate includes a central segment opposite to said light-incident side, and a pair of lateral segments interconnecting said light-incident side and said central segment; and said first microstructure unit includes a plurality of third microstructures adjacent to said central segment.

7. The backlight module according to claim 6, wherein said third microstructures are arranged from said central segment of said surrounding side toward said light-incident side.

8. The backlight module according to claim 6, wherein said third microstructures are extended along an axis normal to said light-incident side and have lengths that decrease as the distance to a nearest one of said lateral segments of said surrounding side of said light guide plate increases.

9. The backlight module according to claim 1, further comprises a casing unit defining a receiving space in which said light source, said light guide plate and said quantum dot enhancement film are disposed, wherein:
said casing unit includes a back plate, and a side frame cooperating with the back plate to define the receiving space; and
said side frame has
an extending portion that is connected to and extends from an outer periphery of said back plate, and
a projecting portion that is connected to said extending portion, that is projected inwardly to the receiving space and that has an inner reflective surface.

10. The backlight module according to claim 9, wherein said projecting portion of said side frame is made of a light reflective material.

11. The backlight module according to claim 1, wherein said first microstructure unit includes a matte surface.

12. The backlight module according to claim 1, wherein said first microstructure unit is disposed to be covered by said quantum dot enhancement film.

13. A display device comprising:
said backlight module of claim 1;
a plurality of optical films that are stacked on said light guide plate; and
a liquid crystal panel that is stacked on said optical films opposite to said light guide plate.

14. A backlight module, comprising:
a light source;
a light guide plate having a light-incident side that faces toward said light source, a surrounding side that is connected to said light-incident side to constitute an outer periphery of said light guide plate, and a first microstructure unit that is disposed adjacent to said surrounding side of said light guide plate; and
a quantum dot enhancement film stacked on said light guide plate;
wherein said first microstructure unit includes a plurality of first microstructures, and said first microstructures include a plurality of indentations having depth-over-width ratios that decrease as a distance to said surrounding side of said light guide plate increases.

15. The backlight module according to claim 14, wherein said first microstructure unit is arranged along a direction from said surrounding side toward a center of said light guide plate, so as to define a microstructure-free region surrounded by said first microstructure unit.

16. The backlight module according to claim 14, wherein said light guide plate includes a central portion and a lateral portion that surrounds said central portion, and that has said light-incident side and said surrounding side, said first microstructure unit being formed only on said lateral portion without being formed on said central portion.

17. The backlight module according to claim 14, wherein said light guide plate further has opposite top and bottom surfaces, one of said top and bottom surfaces faces toward said quantum dot enhancement film, and said first microstructure unit is located on one of said top or bottom surfaces.

18. The backlight module according to claim 14, wherein said quantum dot enhancement film has
a light incident surface facing toward said light guide plate,
an optical surface that is opposite to said light incident surface, and
a second microstructure unit that is located on said optical surface, that is disposed corresponding in position to said first microstructure unit and that includes a plurality of second microstructures.

19. The backlight module according to claim 14, wherein:
said surrounding side of said light guide plate includes a central segment opposite to said light-incident side, and a pair of lateral segments interconnecting said light-incident side and said central segment; and
said first microstructure unit includes a plurality of third microstructures adjacent to said central segment.

20. The backlight module according to claim 19, wherein said third microstructures are arranged from said central segment of said surrounding side toward said light-incident side.

21. The backlight module according to claim 19, wherein said third microstructures are extended along an axis normal to said light-incident side and have lengths that decrease as the distance to a nearest one of said lateral segments of said surrounding side of said light guide plate increases.

22. The backlight module according to claim 14, further comprises a casing unit defining a receiving space in which said light source, said light guide plate and said quantum dot enhancement film are disposed, wherein:
said casing unit includes a back plate, and a side frame cooperating with the back plate to define the receiving space; and
said side frame has
an extending portion that is connected to and extends from an outer periphery of said back plate, and
a projecting portion that is connected to said extending portion, that is projected inwardly to the receiving space and that has an inner reflective surface.

23. The backlight module according to claim 22, wherein said projecting portion of said side frame is made of a light reflective material.

24. The backlight module according to claim 14, wherein said first microstructure unit includes a matte surface.

25. The backlight module according to claim 14, wherein said first microstructure unit is disposed to be covered by said quantum dot enhancement film.

26. A display device comprising: said backlight module of claim 14; a plurality of optical films that are stacked on said light guide plate; and a liquid crystal panel that is stacked on said optical films opposite to said light guide plate.

* * * * *